United States Patent Office 3,242,783
Patented Mar. 29, 1966

3,242,783
DEVICES FOR CUTTING WEBS
Alfred Schmermund, 62 Kornerstrasse, Gevelsberg, Westphalia, Germany
Filed Nov. 27, 1964, Ser. No. 414,057
Claims priority, application Germany, Dec. 2, 1963, Sch 34,252
10 Claims. (Cl. 83—152)

This invention relates to devices for cutting webs, for example for cutting webs provided with an adhesive into smaller pieces as are used for connecting filters to cigarettes.

Such cutting devices have been proposed which each comprises a roller carrying a plurality of cutters co-operating with resilient counter-elements fixed to a suction cylinder which holds the web and the cut-off pieces by suction. For practical reasons the suction cylinder has to have a large diameter and correspondingly a great number of counter-elements have to be provided on the suction cylinder. Owing to wear and tear of the counter-elements, the suction cylinder has to be ground from time to time and after having been ground several times has to be replaced.

It is an object of the invention to provide a device for cutting a web into smaller pieces, the device comprising a suction cylinder and a roller carrying a plurality of cutting knives co-operating with counter-elements which, however, are not fixed to said suction cylinder. Thereby the counter-elements may be ground independently of the suction cylinder.

It is another object of the invention to provide such a cutting device wherein the suction cylinder does not require frequent replacement.

It is a further object of the invention to reduce the number of counter-elements previously required.

It is still another object of the invention to provide simple means for accurately positioning the counter-elements relatively to the periphery of the suction cylinder.

It is still a further object of the invention to provide such a device in which grinding of the suction cylinder may be avoided so that the diameter of the suction cylinder remains unchanged.

Figure 1:
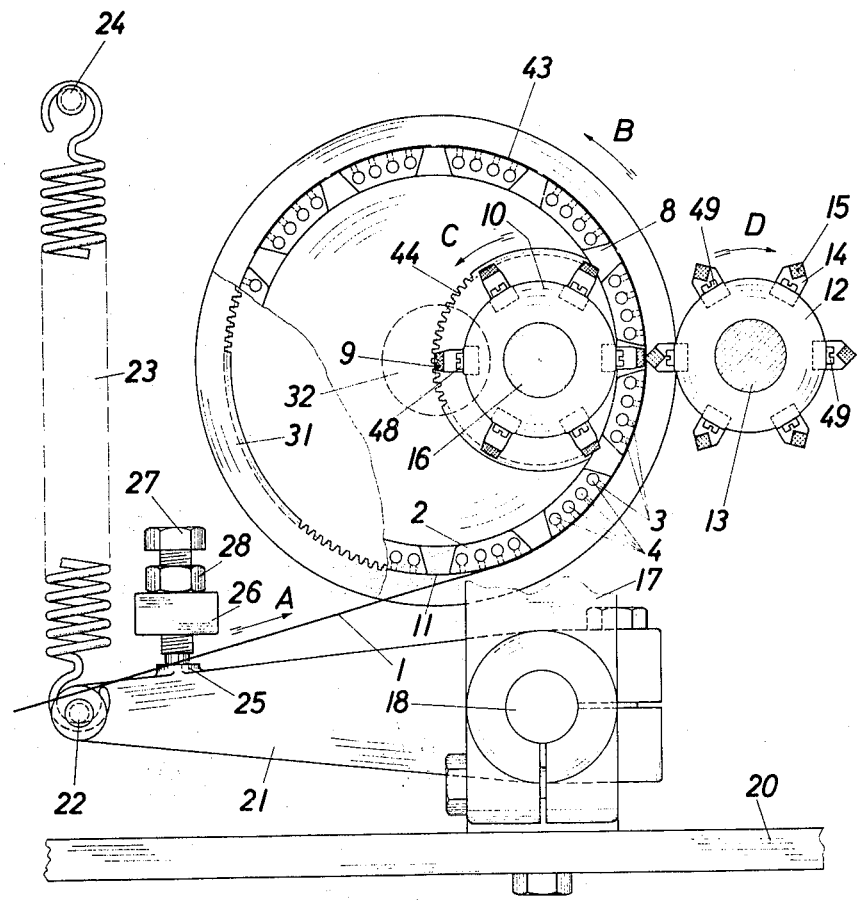
Figure 2:
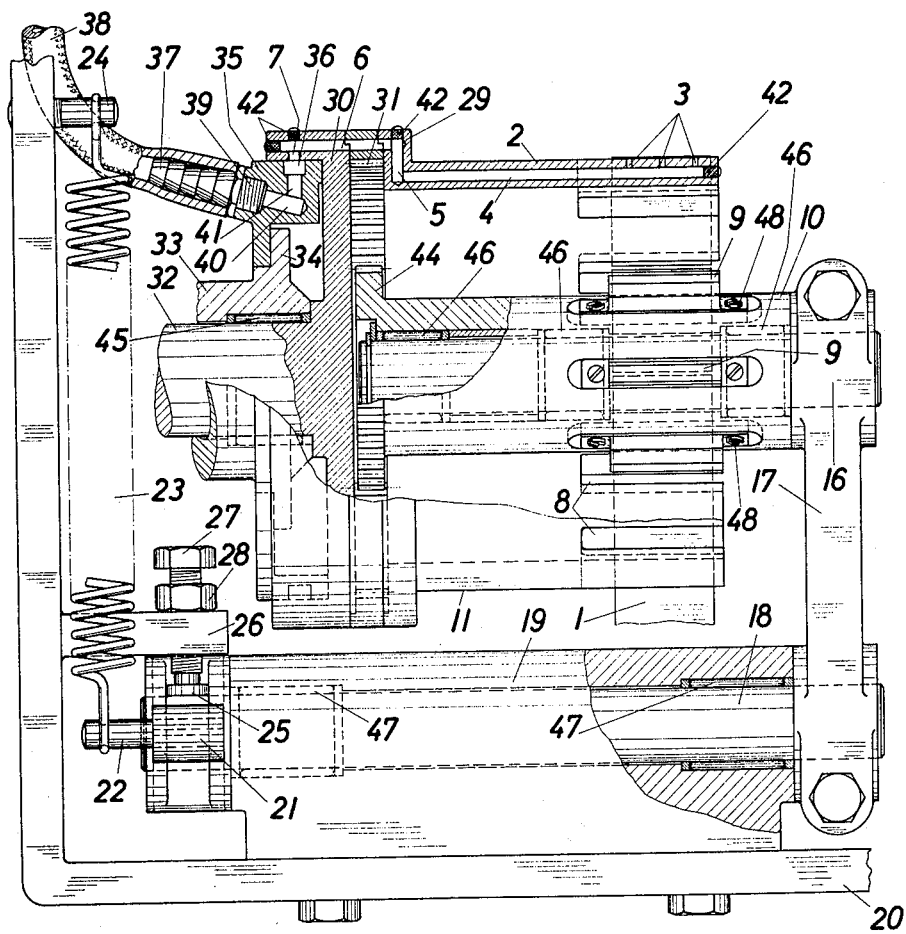

These and the objects and advantages of the invention will become apparent to those skilled in the art from a detailed description of a specific embodiment of the invention, which is given by way of example and is illustrated in the accompanying drawings, in which:

FIG. 1 is a front view, partly in section and partly broken away, of a device of the invention; and FIG. 2 is a side view of the device of FIG. 1, partly in section and partly broken away.

In the drawings, a web 1 is shown which is drawn from a storage device (not shown) and is provided with an adhesive by any suitable and known means (not shown). The web 1 is drawn from the storage device by means of a rotatable suction cylinder 2 which has suction openings 3 disposed at equal distances along the periphery of the suction cylinder 2, and also in the axial direction of said cylinder for a length corresponding to the width of the web 1. Each suction opening 3 communicates with a suction channel 4 leading to a suction channel 5 which leads to a further suction channel 6, the channel 6 leading to another suction channel 7, connectable to a vacuum arrangement as will be described further below. Furthermore, the suction cylinder 2 is provided with elongated slots 8 arranged at equal distances along the periphery of the suction cylinder 2, and extending in the axial direction thereof, each slot 8 having a length greater than the width of the web 1. In the interior of the suction cylinder 2, a rotatable counter-roller 10 is provided carrying a plurality of counter-elements 9 which are so arranged and shaped that they can enter the slots 8, one at a time, with their operative surfaces at the level of the periphery 11 of the suction cylinder 2. The counter-elements 9 are preferably made, at least, at their operative surfaces, of hard metal and are somewhat resilient.

Adjacent the suction cylinder 2, a rotatable cutting roller 12 is provided which is keyed to a shaft 13 rotatable by any known means. Inserts 14 are screwed by means of screws 49 to the cutting roller 12, the inserts 14 being provided with cutters 15 which are preferably made of hard metal. The counter-roller 10 is rotatable about a displaceable shaft 16, the shaft 16 being connected to a first arm 17 keyed to a further shaft 18 rotatably mounted in a bearing 19 fixed to a frame 20 of the device. A second arm 21 is keyed to the other end of the further shaft 18 and carries a pin 22 at its free end, the pin 22 being engaged by an end of a tension spring 23, the other end of which engages a pin 24 fixed on the frame 20. The second arm 21 has an abutment surface 25 bearing, under the action of the spring 23, against the free end of a setscrew 27 which is held by a screw-threaded member 26 of the frame 20 and is secured in position by a nut 28.

The second arm 21 should be longer than the first arm 17, and its length may be twice or three times the length of the first arm 17 or even longer. By rotating the set screw 27 the second arm 21 and therewith the first arm 17 are rotated. This causes the shaft 16 to be moved towards or away from the nearest part of the periphery 11 of the suction cylinder 2. Since the second arm 21 is longer than the first arm 17 the position of the shaft 16 and therewith of the counter-roller 10 can be finely adjusted relatively to the suction roller 2 by turning the setscrew 27.

The suction cylinder 2 is provided with a first flange 29 connected by means of a ring 31 having internal teeth to a second flange 30 keyed to a driving shaft for rotating the suction cylinder 2. The diameter of the pitch circle of the internal teeth of the ring 31 equals the diameter of the periphery 11 of the suction cylinder 2. The driving shaft 32 is rotatably mounted in a bearing 33 rigidly connected to the frame 20 and provided with a flange 34 to which a ring 35 is fixed which is provided with a suction chamber 36 communicating with channels 41, 40 and 39. The channel 39 is at least in part internally screw-threaded. An end piece 37 of a hose 38 is screwed into the channel 39 of the ring 35, the hose 38 leading to a suction device (not shown). The suction chamber 36 communicates through the channels 7, 6, 5 and 4 with the suction openings 3 in the periphery 11 of the suction cylinder 2. Closure means 42 close the ends of the channels 5, 7 and 6. The suction chamber 36 is arcuate and extends peripherally in the ring 35 to an extent required for carrying the web and the cut pieces 43 through a predetermined arc along with the suction cylinder 2.

The counter-roller 10 carries a spur gear 44 which meshes with the internal teeth of the ring 31.

The outer diameter of the counter-roller 10 and the radial height of the counter-element 9 are such that the operating surface of each counter-element 9 when it has fully entered a slot 8 lies at the level of the periphery 11 of the suction cylinder 2. The teeth of the ring 31 and the co-operating spur gear 44 of the counter-roller 10 cause the peripheral speed of the operative surfaces of the counter-element 9 to equal the peripheral speed of the suction cylinder 2. The sides of the counter-element 10 are so shaped that they can enter and leave the slots 8 without hindrance when the suction cylinder 2 and the counter-roller 10 rotate in the directions indicated by the arrows B and C respectively.

The driving shaft 32 is mounted in the bearing 33 by means of roller bearings 45. The counter-roller 10 is mounted on its shaft 16 by means of roller bearings 46, and the shaft 18, which carries the arms 17 and 21, is mounted in the bearing 19 by means of roller bearings 47. Thereby, undesirable play may be avoided or decreased, and a smooth running of the device may be obtained.

By means of the screws 48, the counter-elements 9 may easily be removed from the counter-roller 10 for replacement. The inserts 14 holding the cutters 15 are releasably attached to the cutting roller 12 by means of screws 49.

In operation, the driving shaft 32 rotates the suction cylinder 2 in the direction of the arrow B of FIG. 1. Thereby the ring 31 with its internal teeth is rotated jointly with the suction cylinder 2 and rotates the counter-roller 10 and therewith the counter-elements 9 in the direction of the arrow C by means of the spur gear 44 meshing with the internal teeth of the ring 31. Suction is applied to some of the suction openings 3 through the hose 38, the channels 39, 40, 41, the suction chamber 36, the suction channels 7, 6 and 4, suction being applied to those suction openings 3 which at any time communicate with the suction chamber 36 through the various suction channels just referred to. The end of a web 1 is initially applied to the periphery 11 of the suction cylinder 2 by hand and is subsequently held on the periphery 11 by suction exerted through the suction openings 3. Thereby, while the suction cylinder 2 rotates in the direction of the arrow B, the web 1 is drawn in the direction of the arrow A. The cutting roller 12 is rotated in the direction of the arrow D by any suitable known means (not shown) so that the tips of the cutters 15 rotate about the axis of the shaft 13 with the peripheral speed of the co-operating surfaces of the counter-elements 9 carried by the counter-roller 10. It will be noted from FIG. 1 that the counter-elements 9 enter successive slots 8 of the suction cylinder 2 and co-operate with successive cutters 15. The number of counter-elements 9 equals the number of cutters 15. The counter pressure exerted by the counter-elements on the cutters 15 is adjustable by turning the setscrew 27 in one or the opposite sense after the nut 28 has been loosened, said nut being re-tightened after the setscrew 27 has been suitably turned. From FIG. 1 it will be seen that each cutter 15, while in co-operation with one of the counter-elements 9, cuts off a piece 43 from the web 1. The length of each piece 43 substantially equals the distance, taken from centre to centre, between succeeding slots 8. If the web 1 is drawn from the storage device under tension, then gaps will appear between successive cut off pieces 43. The cut off pieces 43 are held under the action of suction and are carried around with the suction cylinder 2 until the respective suction openings 3 which hold a particular cut off piece 43 no longer communicate with the suction chamber 36, whereupon the cut off pieces are released from the suction cylinder 2 and either drop off therefrom under the action of gravity of are positively removed therefrom by any known and suitable means (not shown). By loosening the screws, 48, the counter-elements 9 may be removed from the counter-roller 10 for re-grinding.

It should be clearly understood that the embodiment hereinbefore described and illustrated in the appended drawings is given by way of example and that modifications, omissions and additions are possible without departing from the spirit of this invention.

I claim:

1. A device for cutting pieces from a continuous web, comprising a rotatable suction cylinder having a plurality of suction openings for holding said web by suction and a plurality of slots along its periphery, a counter-roller, a plurality of counter-elements carried by said counter-roller, each counter element having an operative surface, said counter-roller being arranged within said suction cylinder, means for rotating said counter-roller in dependence on rotation of said suction cylinder, a rotatable cutting roller, and a plurality of cutters carried by said cutting roller, said counter-roller, suction cylinder and cutting roller being arranged for said counter-elements successively to enter said slots with the operative surface of that counter-element which has fully entered one of said slots lying in the periphery of said suction cylinder.

2. A device as defined in claim 1, and further comprising a first shaft, a spur gear rigid with said counter-roller, a ring rigid with said suction cylinder, internal teeth on said ring, said counter-roller being rotatable about said first shaft and said spur gear being in mesh with said internal teeth of said ring.

3. A device as defined in claim 2, wherein the diameter of the pitch circle of said internal teeth equals the diameter of the periphery of the suction cylinder.

4. A device as defined in claim 2, and further comprising a rotatable second shaft, a first arm fixed at different regions thereof to said first shaft and to said second shaft, said first shaft being displaceable, and a second arm fixed to said second shaft for rotating the same whereby to rotate said first arm and to displace said first shaft.

5. A device as defined in claim 4, and further comprising spring means acting on said second arm for urging it to rotate, and thereby to displace said first shaft in one sense.

6. A device as defined in claim 5, and further comprising an abutment on said second arm, and a setscrew, said abutment being urged against said setscrew by said spring means.

7. A device as defined in claim 1, and further comprising means for releasably fixing said counter-elements to said counter-roller.

8. A device as defined in claim 1, and further comprising a suction ring having a suction chamber communicating through a plurality of channels with some of said suction openings.

9. A device as defined in claim 8, and further comprising means for connecting said suction chamber to a suction line.

10. A device as defined in claim 9, and further comprising a bearing, a first flange on said suction ring, a second flange on said bearing, said first and second flanges abutting against each other, and a rotatable shaft for rotating said suction cylinder, said rotatable shaft being mounted in said bearing.

No references cited.

WILLIAM W. DYER, Jr., *Primary Examiner.*

F. T. YOST, *Assistant Examiner.*